United States Patent [19]
Wadell

[11] Patent Number: 5,147,029
[45] Date of Patent: Sep. 15, 1992

[54] ELECTROMAGNETICALLY DRIVER CONVEYOR APPARATUS

[75] Inventor: Lars G. A. Wadell, Aengelholm, Sweden

[73] Assignee: Nestec S.A., Vevey, Switzerland

[21] Appl. No.: 593,864

[22] Filed: Oct. 5, 1990

[30] Foreign Application Priority Data

Oct. 9, 1989 [EP] European Pat. Off. ........ 89118745.2

[51] Int. Cl.$^5$ ............................................. B65G 35/00
[52] U.S. Cl. .................................... 198/619; 198/716; 198/733; 198/805
[58] Field of Search ............... 198/619, 805, 716, 733, 198/727

[56] References Cited

U.S. PATENT DOCUMENTS

| | | | |
|---|---|---|---|
| 384,775 | 6/1888 | Mengis | 198/619 X |
| 2,357,651 | 6/1941 | Hapman | 198/733 |
| 2,922,511 | 1/1960 | Ruppe | 198/716 X |
| 3,762,535 | 10/1973 | Becker et al. | 198/716 |
| 4,724,772 | 2/1988 | Krogsrud | 198/733 X |

FOREIGN PATENT DOCUMENTS 662439 5/1979 U.S.S.R. .............................. 198/805

Primary Examiner—Joseph E. Valenza
Assistant Examiner—Tuan N. Nguyen
Attorney, Agent, or Firm—Vogt & O'Donnell

[57] ABSTRACT

An electromagnetically driven conveyor apparatus has an endless enclosure which is made of a non-magnetic material and which has an interior surface which defines an enclosed channel. Within the channel are a plurality of channel partitioning elements which have a magnetic core and which extend to edges which are slidably fitted against the interior surface of the channel enclosure. A prolongation is positioned between each partitioning element for spacing apart each successive partitioning element. At least two electromagnetic drive units, which movably reciprocate between two positions, are positioned adjacent an outside surface of the enclosure to effect transport of the partitioning elements. Infeed and outfeed units are associated with the channel enclosure for, respectively, introducing product to be conveyed into the channel and removing conveyed product from the channel.

7 Claims, 1 Drawing Sheet

ELECTROMAGNETICALLY DRIVER CONVEYOR APPARATUS

The present invention relates to a conveyor apparatus.

Many conveyors available today are unsuitable for transporting delicate products. For example, screw conveyors are not sufficiently gentle. Belt conveyors generally occupy relatively large areas. In addition, the majority of conveyors are not very flexible nor are they particularly hygienic. We have devised a conveyor which can be more hygienic and flexible than other conveyors, more gentle than screw conveyors and more space saving than belt conveyors.

SUMMARY OF THE INVENTION

According to the present invention, there is provided a conveyor apparatus comprising a closed endless enclosure made of non-magnetic material having infeed and outfeed means defining a channel within which are a plurality of sliding spaced-apart carrier units comprising channel partitioning elements arranged successively within and tightly fitted against the interior surface wall of the enclosure spaced apart by, prolongations between successive carrier units to space the units to form a continuous conveyor unit, each carrier unit having a core of magnetic material and at least two electromagnetic drive units with moving means positioned adjacent an outside surface the endless channel.

DETAILED DESCRIPTION OF THE INVENTION

The endless enclosure of the apparatus of the present invention is made of non-magnetic material and may be a hose or a tube. It may be built up of nodules such as straight parts, elbows, infeed and outfeed units, etc., which may be easily connected and disconnected at any joint, for instance, by rapid clamps without tools. There may, if desired, be more than one infeed and outfeed unit.

The partitioning elements of the carrier units may be, for example, disc or cup-shaped and they may be made of non-magnetic material such as plastics which may conveniently be moulded around the core of magnetic material. For hygienic reasons, the core of magnetic material is preferably completely surrounded by the cover of the partitioning elements of the carrier units.

The partitioning elements of the carrier units may or may not be joined mechanically to one another by means of the prolongations between successive carrier units. The space formed by the prolongations between each successive carrier unit is to be occupied by the product to be transported. The carrier units thus form one endless conveyor unit where each carrier unit pushes the preceding carrier unit forward.

The electromagnetic drive units may advantageously fully or partly surround the endless channel. More than two drive units may be used, e.g., four or even more. The electromagnets may be moved back and forth, i.e. reciprocated by mechanical, electrical, pneumatic or hydraulic devices. The current switch on and off of the magnets of the drive units is synchronised with the movement of the drive units. The drive units can easily be transferred from one conveyor to another.

The conveyor apparatus of the present invention is especially suitable for the gentle and hygienic transportation of delicate products because the drive of the carrier unit inside the closed endless channel is touchless. By "touchless" we mean that the carriers are not in contact with any drive means such as cog wheels, shafts, sprockets, etc., which could cause contamination from outside. With suitable design of the infeed and outfeed means, the conveyor could be used for aseptic conveying and filling of products.

The conveyor can be designed to meet all demands, e.g., it can transport up, down or sideways as desired. It is suitable for all materials which have a piece size small enough to enter the spaces between the carrier units. The endless enclosure may be flexible, oscillating or may perform some other movement, e.g., to discharge a product evenly on the full width of a conveyor belt, etc. Since the endless channel formed by the enclosure is completely closed, there is no spillage.

BRIEF DESCRIPTION OF THE DRAWINGS

The present invention is further described by way of example with reference to the accompanying drawings.

DETAILED DESCRIPTION OF THE DRAWINGS

Figure 3:
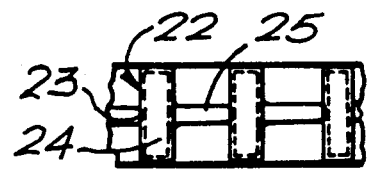
FIGS. 3 and 4 are top sectional views of portions of the conveyor to illustrate different shapes of prolongations.
Figure 4:
Figure 5:
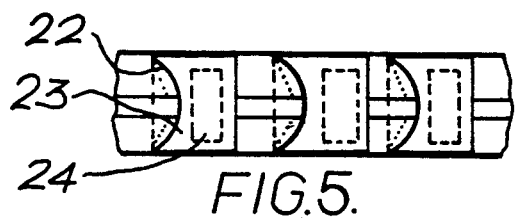
FIG. 5 is a sectional view of a portion of the conveyor to illustrate cup-shaped partitioning elements.

Referring to the drawings, the conveyor apparatus comprises a plastics tube generally designated 10 made up of nodules consisting of straight parts 11,12, elbows 13,14,15,16, infeed unit 17 and outfeed unit 18 connected by joints 19. Surrounding the plastics tube 10 are two ring-shaped electromagnetic drive units 20,21. Inside the plastics tube 10 are disc-shaped partitioning elements 22 having a plastics cover 23 moulded around a core of magnetic steel 14 fitted exactly against the inside walls of the plastics tube 10 and capable of sliding along the plastics tube. FIG. 5 illustrates cup-shaped carrier units 22, each having cover 23 and core 24. Each carrier unit is provided with a prolongation 25, which is "nose" shaped in FIGS. 1, 3, and 5 and which is "cage" shaped in FIG. 4, which supports the succeeding carrier unit in the endless channel.

The product 26 to be transported is present in the spaces between the disc shaped carriers.

Figure 1:
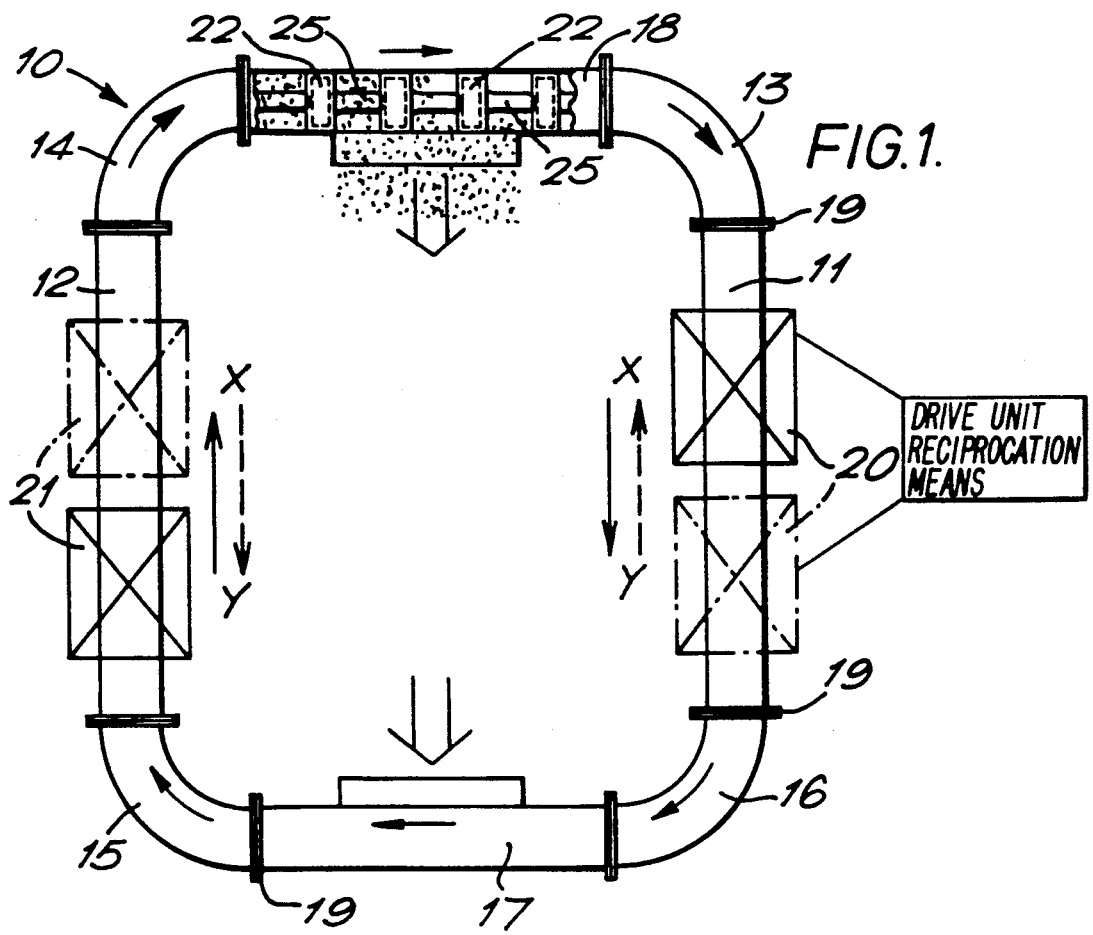
FIG. 1 is a top sectional view of the conveyor.
Figure 2:
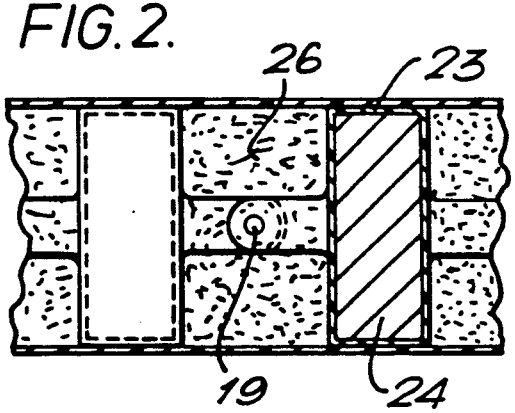
FIG. 2 is an enlarged side sectional view of a portion of the conveyor of FIG. 1 transporting product.

In operation, the product 26 to be transported 26 is filled into the spaces between the disc-shaped partitioning elements 22 at the infeed unit 17 and the drive units 20,21, reciprocate between the positions indicated by X and Y in FIG. 1 by means of conventional mechanical means. When one electromagnet (20 or 21) of the drive units moves in the direction of transport as indicated by the solid arrow in FIG. 1, its current is switched on and the carrier units inside the tube close to the magnet are influenced by the magnetic force and move with the magnet. At the same time the other electromagnet (20 or 21) moves in the direction opposite to the transport direction with its current switched off so that the carrier units inside the tube close to this electromagnet or not influenced by the magnetic force. This causes the partitioning elements 22 to slide smoothly in the tube 10 in the direction of the arrows shown in FIG. 1 until they reach the outfeed unit 18 where the product 26 is released.

I claim:

1. A conveyor apparatus comprising:
   an endless enclosure having an interior surface defining a channel and being made of a non-magnetic material;
   infeed means associated with the enclosure for introducing products into the channel for being conveyed through the channel;
   outfeed means associated with the enclosure for removing conveyed products from the channel;
   a plurality of channel partitioning elements having edges which are slidably fitted against the interior surface of the enclosure and having a magnetic core;
   a prolongation positioned between each partitioning element for spacing apart each successive partitioning element of the plurality of partitioning elements;
   at least two electromagnetic drive units positioned adjacent an outside surface of the enclosure; and
   moving means for movably reciprocating each electromagnetic drive unit.

2. An apparatus according to claim 1 wherein the magnetic core of the partitioning elements is surrounded by a plastic material which extends to the edges.

3. An apparatus according to claim 1 wherein the partitioning elements are disc-shaped.

4. An apparatus according to claim 1 wherein the partitioning elements are cup-shaped.

5. An apparatus according to claim 1 wherein each prolongation is joined to at least one partitioning element.

6. An apparatus according to claim 1 wherein the electromagnetic drive units surround the outside surface of the enclosure.

7. An apparatus according to claim 1 wherein current switch on and off of the electromagnetic units is synchronized with the reciprocal movement of the units so that electrical current of an electromagnetic unit reciprocated in the direction of movement of travel of the partitioning elements is switched on and electrical current of an electromagnetic unit reciprocated in a direction opposite of a direction of movement of travel of the partitioning elements is switched off.

* * * * *

UNITED STATES PATENT AND TRADEMARK OFFICE
CERTIFICATE OF CORRECTION

PATENT NO. : 5,147,029
DATED     : September 15, 1992
INVENTOR(S) : Lars G.A. Wadell, et al.

It is certified that error appears in the above-indentified patent and that said Letters Patent is hereby corrected as shown below:

On the Title page, in the title (item [54]), "DRIVER" should be --DRIVEN--.

Column 1, line 2, "DRIVER" should be --DRIVEN--.

Column 1, line 4, insert --BACKGROUND OF THE INVENTION--.

Column 1, line 25, delete the comma after "by".

Column 1, line 60, insert a comma after "i.e.".

Column 2, line 40, "14" should be --24--.

Column 2, line 50, delete the second occurrence of "26".

Signed and Sealed this

Thirty-first Day of August, 1993

Attest:

BRUCE LEHMAN

*Attesting Officer*     *Commissioner of Patents and Trademarks*